Oct. 9, 1923.  1,470,458
G. H. LOCKERT
ANIMAL POKE
Filed Dec. 28, 1922
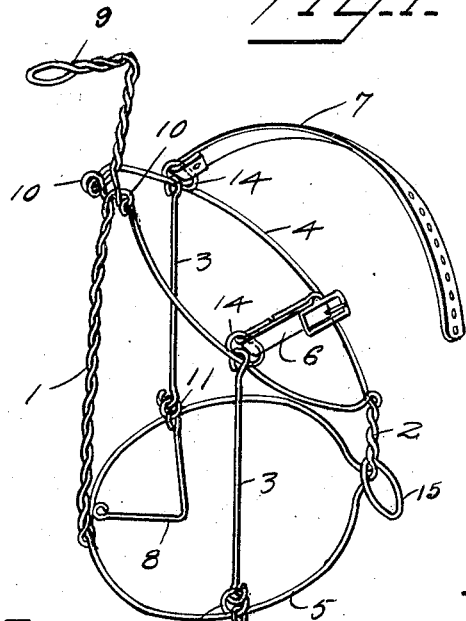
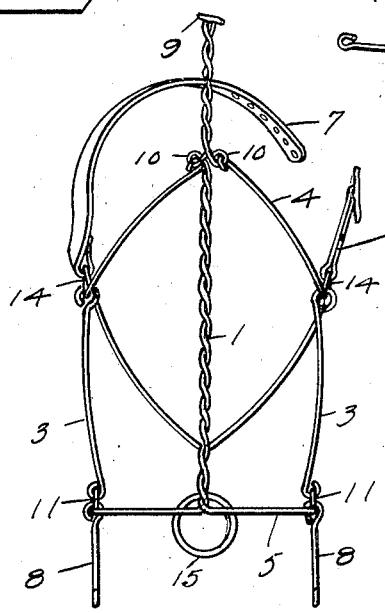
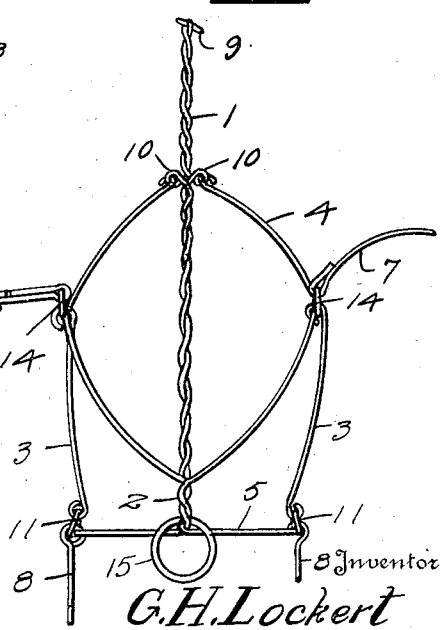

Patented Oct. 9, 1923.

1,470,458

UNITED STATES PATENT OFFICE.

GEORGE H. LOCKERT, OF ELMWOOD, OKLAHOMA.

ANIMAL POKE.

Application filed December 28, 1922. Serial No. 609,420.

*To all whom it may concern:*

Be it known that I, GEORGE H. LOCKERT, a citizen of the United States, residing at Elmwood, in the county of Beaver and State of Oklahoma, have invented certain new and useful Improvements in Animal Pokes; and I do hereby declare the following to be a full, clear, and exact description of the invention, such as will enable others skilled in the art to which it appertains to make and use the same.

The invention has relation to that type of devices adapted to be applied to the head of an animal whereby to confine it to certain limits and prevent its leaving an enclosure by passing under, through or over a barrier such as a fence.

In accordance with the present invention, the device is constructed solely of wire with the exception of the head strap, the main frame consisting of a single length of wire bent into the form substantially as shown in the accompanying drawings and referred to in detail hereinafter.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a perspective view of an animal poke embodying the invention,

Figure 2 is a front view, and

Figure 3 a rear view thereof.

Corresponding and like parts are referred to in the following description and designated in the several views of the drawings by like reference characters.

The device comprises a front stay 1, rear stay 2, side stays 3, upper band 4, lower band 5 and a head strap which comprises a short section 6 provided with a buckle and a long section 7 adapted to make adjustable connection with the short section. Lower side hooks 8 are loosely connected with the lower band 5 in line with the side stays 3. An upper front hook 9 is provided at the top of the front stay 1.

In constructing the device, the front and rear stays 1 and 2, respectively, the upper front hook 9 and the upper and lower bands 4 and 5, respectively, constitute parts of a single length of wire of suitable gage bent into the form substantially as shown. The length of wire is doubled upon itself and the folded portions are twisted to form the front stay 1, the end adjacent the fold being bent laterally to provide the hook 9. The folded portions of the wire are bent to provide oppositely disposed lateral eyes 10 and at the end of the intertwisted portions forming the stay 1, they are bent laterally in opposite directions to form the lower band 5, the latter being provided at opposite points with eyes 11 into which the hooks 8 and the lower ends of the side stays 3 are looped, said eyes 11 being formed by bending portions of the wire in the manner indicated. After forming the lower band 5, the ends of the wire are again twisted together to form the rear stay 2 and are bent laterally to provide the upper band 4, the extremities of the wire being looped into the eyes 10. The upper band 4 is provided at opposite points with eyes 14 formed by bending the wire, said eyes receiving the upper ends of the side stays 3 and the lower ends of the sections 6 and 7 comprising the head strap. It will thus be understood that the main frame of the device is light, strong and durable and free from joints except where the extremities of the wire engage the eyes 10. The side stays 3, hooks 8 and head strap are in line, hence any strain coming upon the hooks 8 is sustained directly by the head strap without any tendency to strain or distort the appliance. Strain coming upon the upper front hook 9 is distributed throughout the structure because of the arrangement of the parts.

When placing the device in position, it is slipped upon the head from the nose upward and when in position, the lower band 5 receives the muzzle and the upper band 4 encircles the upper portion of the head forwardly of the throat and brow, the stays 3 extending along the cheek and the stay 1 being disposed in front of the face, the head strap comprising the parts 6 and 7 passing over the head in the rear of the horns and ears, thereby securing the device to the head. The hooks 8 prevent the animal from passing over an enclosure and the hooks 9 prevent the animal from passing beneath an enclosure. A ring 15 is applied to the rear or throat stay 2 to receive a tether when the animal is restricted in its movements.

What is claimed is:

An animal poke comprising a main frame formed of a single length of wire and comprising upper and lower bands and front and rear stays, the latter consisting of portions of the wire which are twisted together, the front stay having its upper portion bent forwardly to provide a hook and having lateral eyes into which the extremities of the wire are looped, and the upper and lower bands having oppositely disposed side eyes, side stays looped into the eyes of the upper and lower bands, lower side hooks looped into the eyes of the lower band, and a sectional head strap having the sections engaging the eyes of the upper band.

In testimony whereof I affix my signature in presence of two witnesses.

GEORGE H. LOCKERT.

Witnesses:
JAS. H. CRABTREE,
MYRTLE NILES.